Figure 17:
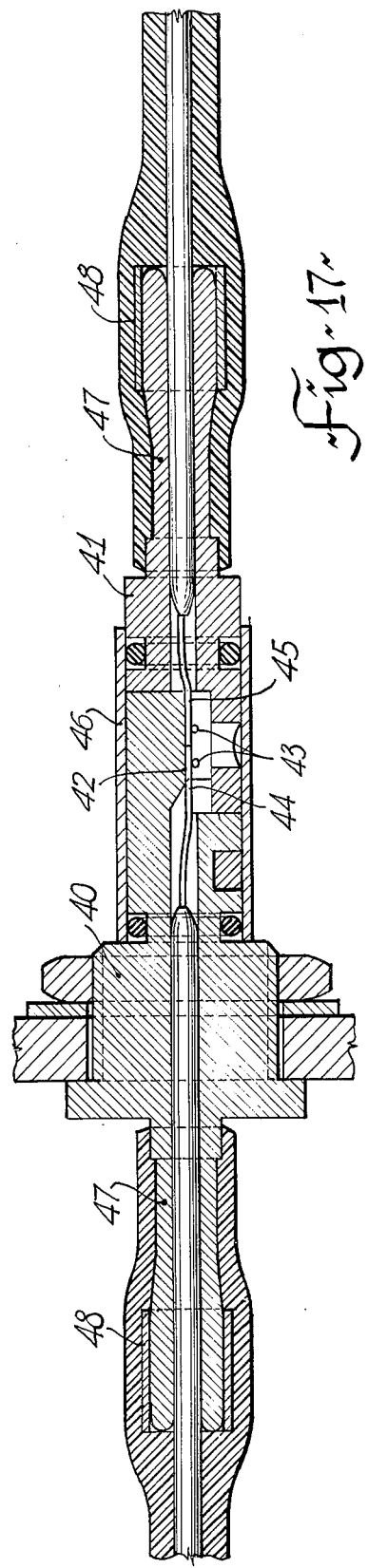

United States Patent
Lukas et al.

[11] 3,946,467
[45] Mar. 30, 1976

[54] CLAMP FOR AN OPTICAL FIBRE

[75] Inventors: Helmut H. Lukas, Carleton Place; Jack F. Dalgleish, Ottawa, both of Canada

[73] Assignee: Northern Electric Company, Limited, Montreal, Canada

[22] Filed: Dec. 9, 1974

[21] Appl. No.: 530,817

[52] U.S. Cl.................................. 24/260; 350/96 C
[51] Int. Cl.² ..................... A44B 21/00; G02B 5/14
[58] Field of Search............ 24/1, 1.1, 115 R, 115 A, 24/115 K, 115 M, 263 DM, 265 EC, 260; 350/96 C

[56] References Cited
UNITED STATES PATENTS

| | | | |
|---|---|---|---|
| 80,378 | 7/1868 | Wright | 24/260 |
| 389,072 | 9/1888 | Gordon | 24/260 |
| 992,821 | 5/1911 | Stewart | 24/115 M |
| 1,573,737 | 2/1926 | Norman | 24/115 R |
| 1,643,110 | 9/1927 | Briggs | 24/115 A |
| 2,166,585 | 7/1939 | Evans | 24/260 |
| 3,768,146 | 10/1973 | Braun et al. | 350/96 C |
| 3,769,685 | 11/1973 | Noda | 24/115 A |
| 3,789,485 | 2/1974 | Gudmestad | 350/96 C |
| 3,790,791 | 2/1974 | Anderson | 350/96 C |

FOREIGN PATENTS OR APPLICATIONS

| | | | |
|---|---|---|---|
| 24,023 | 10/1897 | United Kingdom | 24/115 M |

*Primary Examiner*—Donald A. Griffin
*Attorney, Agent, or Firm*—Sidney T. Jelly

[57] ABSTRACT

A clamp for a plastic coated optical fibre comprises a tubular portion which is a fairly close sliding fit on the coated fibre and an axially split portion having at least one resilient axially deformable finger. The dimension across the split section is slightly larger than across the other portion. An axially split sleeve is axially slidable on the clamp, and is freely slidable along the tubular portion on to the slit portion. Sliding of the sleeve on to the slit section deforms the finger into gripping contact with the fibre coating and also expands the sleeve. This provides a "backing up" force and also accommodates variations in diameter of coated fibre. More than one finger can be provided, and serrations or other formations can be provided on the fingers.

7 Claims, 18 Drawing Figures

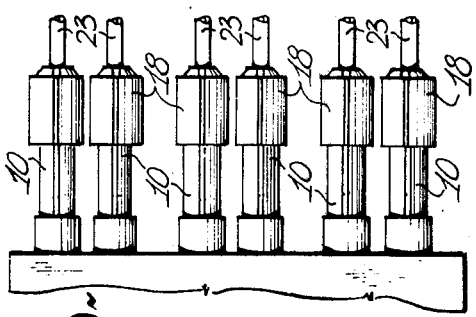
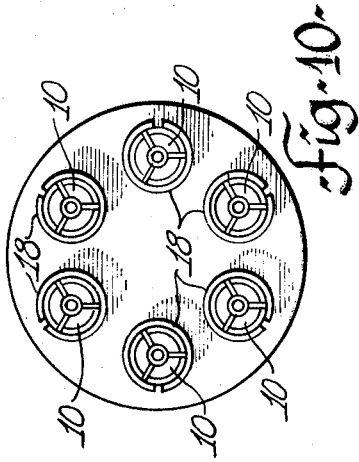
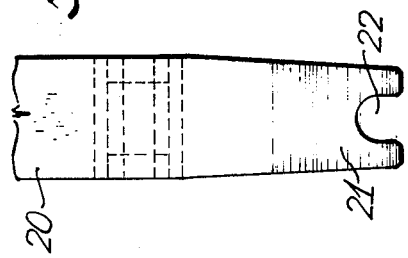
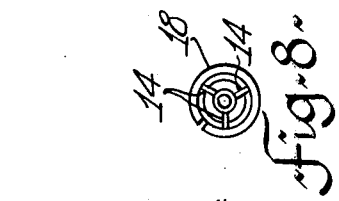
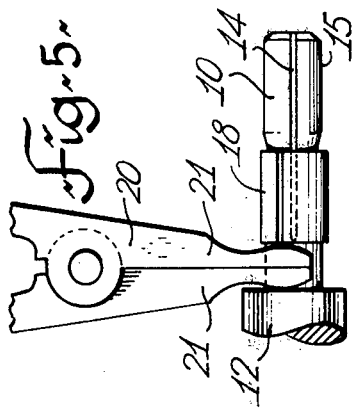
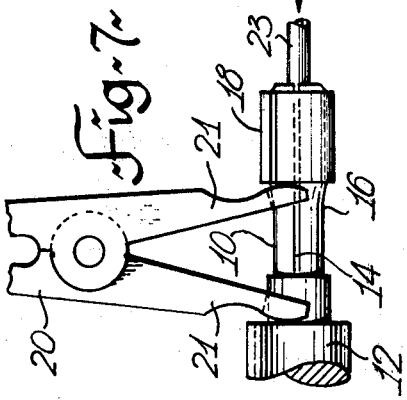
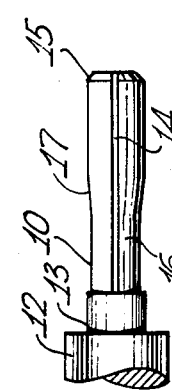
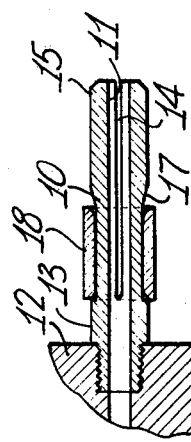
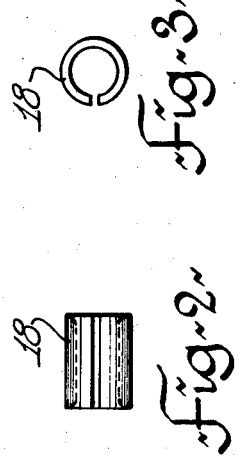

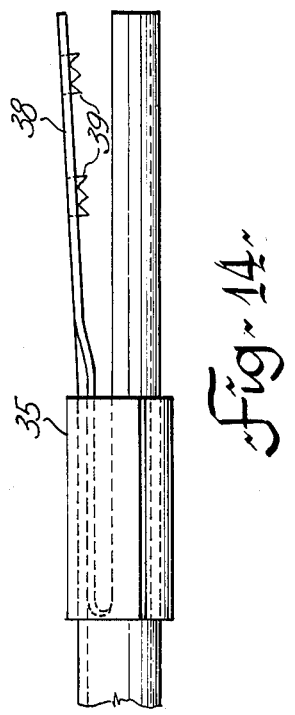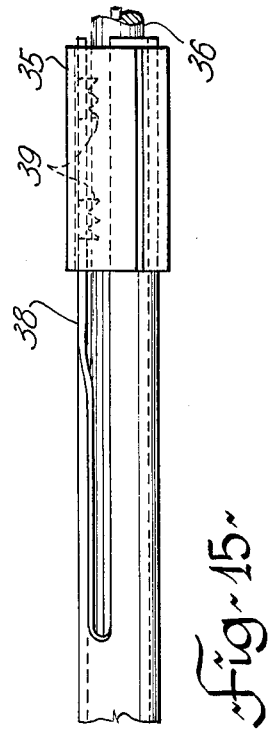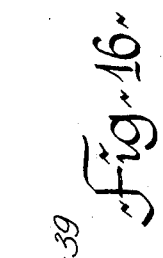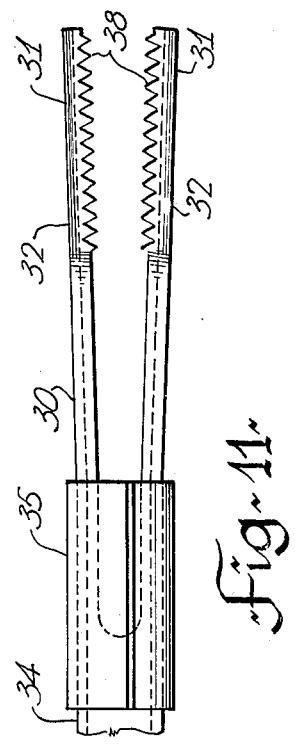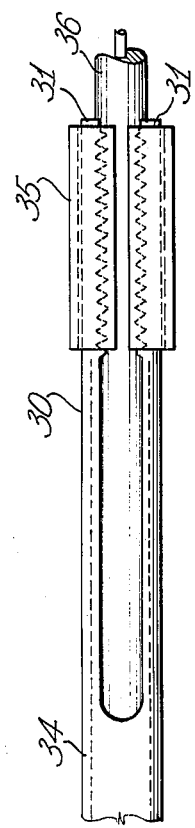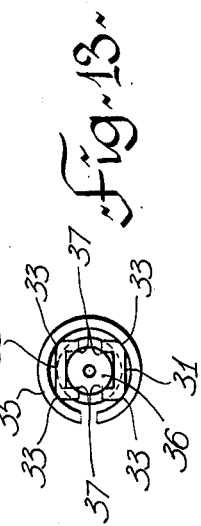

CLAMP FOR AN OPTICAL FIBRE

This invention relates to a clamp for an optical fibre and is particularly concerned with a clamp for maintaining longitudinal location of a fibre.

Optical fibres normally comprise a light conducting core or fibre which is coated with a flexible layer — for protection, increased strength and ease of handling. For efficient coupling, it is necessary that the light conducting fibres be axially aligned accurately and in close end-to-end relationship. A coupling for obtaining accurate axial alignment can be provided, in the form of a connector or splice, and it is necessary to provide some means for clamping or gripping to prevent longitudinal movement in the connector or splice.

Also, it is often necessary to clamp or grip coated optical fibres on other occasions, such as when passing through bulkheads, entering apparatus enclosures and similar eventualities if coupling is not being attempted.

Certain problems assert themselves when attempting to clamp or grip a coated fibre. Too high a clamping or gripping pressure can break, or damage, the light conducting fibre preventing or severely reducing light transmission. As the coating is usually a plastic material which is flexible, it is difficult to hold a coated fibre without some slipping or other movement occurring. As stated too high a gripping pressure will cause damage and too low will allow movement.

There are also difficulties arising as a result of temperature variations. Increase in temperature may cause the coating to soften and this will reduce gripping pressure. There will also be variations in dimensions due to thermal expansion and contraction associated with temperature variations.

The present invention provides a clamp or grip for an optical fibre in which a split resilient member is forced into clamping or gripping engagement by a further member, and in which the further member is itself a split or noncontinuous resilient member. Thus there is provided a clamp or grip in which the clamping or gripping force is applied by a resilient member or the like which can substantially reduce the effect of manufacturing tolerances, creep of the coating, softening of the coating, and other reasons, on the gripping or clamping force on the coated fibre.

Figure 18:
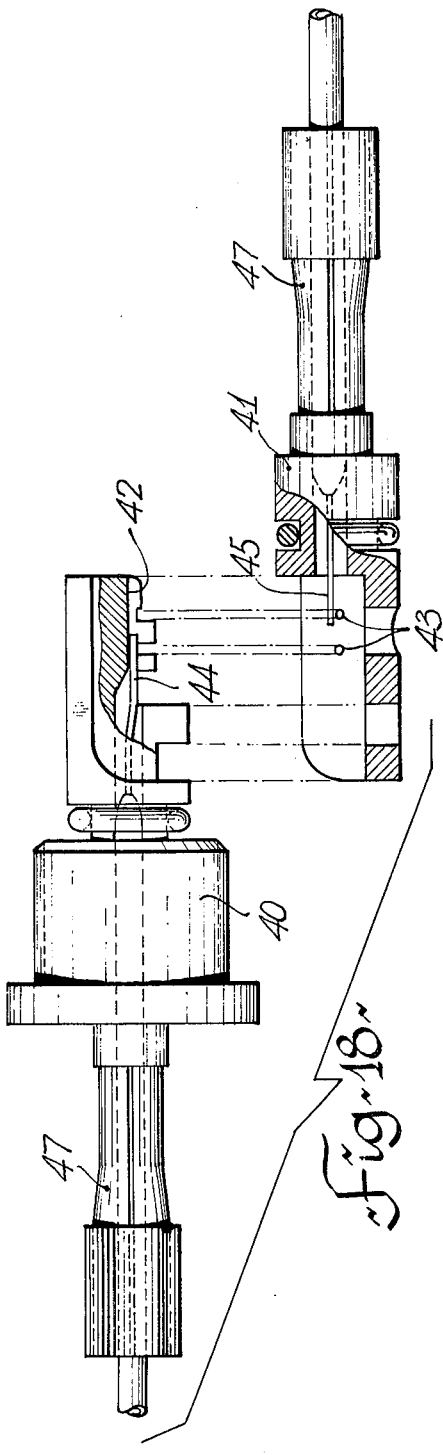

The invention will be readily understood by the following description of certain embodiments, by way of example, in conjunction with the accompanying drawings, in which:

FIG. 1 is a side view of a clamp or grip member;
FIG. 2 is a side view of a resilient split sleeve for positioning over the member of FIG. 1;
FIG. 3 is an end view of the sleeve of FIG. 2;
FIG. 4 is a cross-section on the longitudinal axis of a clamp member as in FIG. 1 with the split sleeve in the assembled position;
FIG. 5 is a side view, similar to that of FIG. 1 illustrating the split sleeve assembled on the member and one form of tool for axially sliding the sleeve into the gripping position;
FIG. 6 is a view on a face of the tool in FIG. 5 illustrating the shape thereof;
FIG. 7 is a side view similar to that of FIG. 5 illustrating the split sleeve axially displaced to the position in which a gripping force is applied;
FIG. 8 is an end view of FIG. 7 in the direction of arrow A;
FIG. 9 is a side view of an in-line assembly of a plurality of clamps or grips;
FIG. 10 is an end view of a circular arrangement of a plurality of clamps or grips;
FIG. 11 is a side view of an alternative form of clamp or grip ready for positioning on a coated fibre;
FIG. 12 is a side view of the clamp or grip of FIG. 11 on a fibre, with the outer sleeve moved into the gripping position;
FIG. 13 is an end view of the clamp of FIG. 12;
FIG. 14 is a side view of a further form of clamp or grip, ready for positioning on a coated fibre;
FIG. 15 is a side view of the clamp or grip of FIG. 14, on a fibre, with the split sleeve in the gripping position;
FIG. 16 is an end view of the clamp of FIG. 15;
FIG. 17 illustrates one form of coupling embodying the present invention, prior to coupling;
FIG. 18 is a longitudinal cross-section through the coupling of FIG. 17 in the coupled condition.

The broad concept of the present invention is illustrated in FIGS. 1 to 8. Basically a clamp comprises a gripping member 10, in the present example cylindrical, having a central bore 11 of a diameter to receive a coated optical fibre. In the example illustrated the gripping member 10 is shown inserted into a holding member 12, at its inner end 13, as by threading, brazing, or the like.

The gripping member 10 is split longitudinally by three slits 14 which extend from the outer end 15 towards the inner end 13 and form three cantilevered fingers. The outer diameter of the gripping member 10 varies. At the outer end 15 it is slighty larger in diameter than at an intermediate portion 16. Between the portion 16 and the larger diameter end portion is a tapered portion 17. Positioned on the gripping member 10 is a resilient split sleeve 18. The sleeve 18 is an easy fit on the reduced portion 16 of the gripping member. The sleeve can be slid along the gripping member, over the tapered portion 17 onto the larger diameter portion. In this latter position the sleeve pushes down the cantilevered fingers to grip a fibre.

FIGS. 5, 6 and 7 illustrate one way of moving the split sleeve laterally, by means of a pair of pliers or similar tool 20 which has two projecting members 21 shaped at the ends 22 to fit round the gripping member 10. Squeezing together the handle portions of the pliers opens the members 21 and the sleeve is moved axially, as seen in FIG. 7.

In gripping, or clamping, an optical fibre — shown at 23, the cantilevered fingers are urged into gripping engagement with the fibre by the sleeve 18. Sleeve 18, being split, also expands slightly as it is moved onto the enlarged portion of the gripping member 10. Thus there is a resilient loading applied to the cantilevered fingers. This provides a "backing up" load in the event of the fibre outer diameter varying in service. For example there may be creep of the coating material which would severely reduce the gripping force if a solid sleeve were to be used. This is particularly likely to occur at elevated temperatures.

It is possible that under some operating conditions, the outer diameter of the fibre coating could reduce — as a result of some local distortion under the gripping force of the fingers, or under low temperature conditions. Under such conditions, a "backing up" load is still applied by the split sleeve.

FIGS. 1 to 8 illustrate a single clamping or gripping device. Such devices can be used in multiple, for example when cables are being connected, either to apparatus or to another cable. Two examples of such multiple arrangements as seen in FIGS. 9 and 10. FIG. 9 illustrates an "in-line" arrangement and FIG. 10 illustrates a circular arrangement. Several in-line arrangements as in FIG. 9 can be positioned side-by-side, and there can be more than one circle of gripping devices as in FIG. 10.

From the above description it will be seen that engagement between the gripping member 10 and the outer diameter of the fibre is retained over a wide variation in operating conditions. The fibre is easily inserted as the cantilevered fingers are in a completely relaxed condition when the sleeve 18 is over the reduced portion 16. Once engaged with the fibre by lateral displacement of the sleeve 18 the gripping and locating of the fibre is maintained.

Engagement between the gripping member and the outer layer of the fibre can be enhanced by providing formations on the gripping member which can press into the fibre coating. Also, it is possible to form the gripping member from strip material instead of solid material. It is also possible to give the gripping member a configuration other than a round cylinder.

FIGS. 11, 12 and 13 illustrate a device in which the gripping member 30 is made from strip material formed into a tube. Two opposed cantilevered fingers 31 are produced. The fingers 31 are each formed to a channel shaped cross-section to give an approximately square cross-section at the outer portion 32 of the member 30, the section having rounded corners 33. The dimension diametrically across the rounded corners 33 is slightly larger than at the rounded rear portion 34. Therefore as the split sleeve 35 is moved axially it pushes the fingers toward each other.

The inner dimensions of the channel shaped fingers are such that a coated fibre - 36 - can easily be inserted prior to axial movement of the sleeve 35 but the inner corners 37 of the fingers will engage with the fibre when the sleeve is moved axially to be positioned over the channel shaped fingers.

FIGS. 11, 12 and 13 also illustrate serrations 38 on the edges of the fingers 31. These serrations engage with the coating of the fibre, becoming slightly embedded as seen in FIG. 13.

FIGS. 14, 15 and 16 illustrate a further form, which may also be formed from strip, or from tube. This example has a single cantilevered finger 38 which is pushed down onto the coated fibre 36 by the sleeve 35. Serrated members 39 can be provided. The form of the serrated members 39 can vary, being "barbs" or teeth, or a circular tang, or of other forms.

Although only one finger 38 is shown in FIGS. 14, 15 and 16, more than one, for example two or three, can be provided. Also, in the example of FIGS. 11, 12 and 13, only one finger can be provided, or three or even more. While three fingers have been shown in other examples, it will be appreciated that this is by way of example only. Four fingers can readily be provided, for example. To some extent, the number of fingers can be related to the required gripping force. For light forces, a single finger, as in FIGS. 11, 12 and 13, is often sufficient.

The depth of penetration of barbs, tangs, and the like needs to be controlled to prevent damage to the fibre. Typically, for a 0.006 inch diameter glass fibre coated with nylon to a diameter of 0.040 inches, the depth of penetration can be up to approximately one-half of the coating thickness without damage to the glass fibre.

Clamping or gripping members can be used for various purposes. Thus they can be used when fibres are passing through bulkheads or passing through casings around apparatus. They can also be used in couplings (i.e., connectors or splices), which couple fibres to each other or to some item of apparatus, for example a light emitting diode or a photodiode.

FIGS. 17 and 18 illustrate one form of coupling for connecting two fibres end to end. The connector, described in more detail in U.S. Pat. No. 3,885,859, issued on May 27, 1975, to the present assignee, comprises two coupling members 40 and 41. Coupling member 40 has a V-shaped groove 42 at its outer end. In the outer end of the member 41 are two spaced apart parallel resilient members 43 extending diametrically across the member. When assembled the two outer ends of the members 40 and 41 are moved together laterally and the resilient members 43 press down the ends of the two opposed fibres 44 and 45 into the V-shaped groove 42. Interengaging formations on the coupling members prevent axial movement between members and a sleeve 46 maintains the members in coupled position.

Each coupling member 40 and 41 includes a clamping or gripping device 47. In the particular example illustrated each gripping device 47 is of the form illustrated in FIGS. 1 to 8 and described above. After final assembly the clamping or gripping devices are covered by a flexible sleeve 48, such as a heat shrink plastic sleeve.

The important feature of clamping or gripping devices, in accordance with the present invention, is to balance the load applied by the fingers of the gripping member against the fibre coating's ability to resist the load without damaging the glass fibre. The applied load is determined essentially by the thickness and length of the split sleeve and by the amount of interference between the inside diameter of the sleeve and the larger outside diameter of the enlarged end of the cantilevered fingers. The resistance from the coated fibre to the applied load is determined essentially by the thickness of the coating, the hardness of the coating and the compressive properties of the coating.

Typical dimensions for a device as in FIGS. 1 to 8 are 0.93 inches diameter for the enlarged end portion, .080 inches diameter for the reduced diameter portion 16, .350 inches for the length of the cantilevered fingers, and a bore 11 of .042 inches. The sleeve 18 has a bore of .082 inches, a length of .160 and an outer diameter of .110 inches, hen made from Beryllium copper and ASTM-B196 alloy 172, heat treated at 600°F for two hours. A typical fibre for such a device has a coating of nylon with a diameter of approximately .040 inches covering a glass fibre with a diameter of approximately .006 inches, as described above.

What is claimed is:

1. A clamp for gripping a single optical fibre; comprising:
   a tubular member having a bore therethrough of a diameter to receive a single coated optical fibre, and having a forward end and a rearward end;
   said tubular member including a first external diameter at said forward end and a second external diameter remote from said forward end, said first diameter larger than said second diameter, and a tapered portion between said first and second diameters, said tapered portion connecting said first diameter to said second diameter;

therebeing a plurality of slits extending axially from said forward end to define a plurality of resilient cantilevered fingers;

a resilient sleeve on said tubular member, said sleeve having a bore which is a sliding fit on said second diameter of said tubular member and smaller in diameter than said first diameter of said tubular member, therebeing a slit extending axially the full length of said sleeve;

said resilient sleeve adapted to be moved axially on said tubular member over said tapered portion onto said first diameter to resiliently deform said cantilevered fingers into gripping relationship with said coated optical fibres, the sleeve also resiliently deformed to a larger diameter to provide a residual resilient force on said fingers after deformation of said fingers.

2. A clamp as claimed in claim 1, said tubular member composed of strip material formed into a tubular shape.

3. A clamp as claimed in claim 2, at least said axially slit section of a substantially square cross-section having rounded corners, said split sleeve of circular cross-section and of a diameter less than the diametrical dimension across said rounded corners.

4. A clamp as claimed in claim 3, said hollow member including two opposed resilient fingers.

5. A clamp as claimed in claim 1, including formations on said resilient fingers for engagement with said outer coating of the coated fibre.

6. A clamp as claimed in claim 5, said formations comprising serrations on corners of the resilient fingers.

7. A clamp as claimed in claim 5, said formations comprising serrations on said fingers.

* * * * *